(12) United States Patent
Hein et al.

(10) Patent No.: US 10,655,001 B2
(45) Date of Patent: May 19, 2020

(54) HIGH DUCTILITY BLENDS OF PMMA AND POLYCARBONATE-SILOXANE COPOLYMER

(71) Applicant: SABIC GLOBAL TECHNOLOGIES B.V., Bergen op Zoom (NL)

(72) Inventors: Christopher Luke Hein, Mt. Vernon, IN (US); Hao Zhou, Mt. Vernon, IN (US); Bing Zhou, Mt. Vernon, IN (US); Manojkumar Chellamuthu, Mt. Vernon, IN (US); Peter Vollenberg, Mt. Vernon, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/659,692

(22) Filed: Oct. 22, 2019

(65) Prior Publication Data
US 2020/0123373 A1    Apr. 23, 2020

(30) Foreign Application Priority Data

Oct. 22, 2018    (EP) .................................... 18201793

(51) Int. Cl.
*C08L 33/12*    (2006.01)
*C08L 69/00*    (2006.01)
*C08L 83/10*    (2006.01)

(52) U.S. Cl.
CPC ............. *C08L 33/12* (2013.01); *C08L 69/00* (2013.01); *C08L 83/10* (2013.01); *C08L 2203/16* (2013.01); *C08L 2205/035* (2013.01)

(58) Field of Classification Search
CPC ........... C08L 33/12; C08L 69/00; C08L 83/10
See application file for complete search history.

(56) References Cited

U.S. PATENT DOCUMENTS

| 4,478,981 | A   | 10/1984 | Arkles |
| 4,743,654 | A   | 5/1988  | Kyu et al. |
| 4,745,029 | A   | 5/1988  | Kambour |
| 5,280,070 | A   | 1/1994  | Drzewinski |
| 2008/0033108 | A1 * | 2/2008 | Kung ..................... C08L 55/02 525/67 |
| 2011/0281995 | A1 | 11/2011 | Ha et al. |
| 2012/0220709 | A1 | 8/2012  | Tanaka |
| 2013/0261234 | A1 | 10/2013 | Ma |
| 2018/0030259 | A1 | 2/2018  | Somasundaram et al. |
| 2018/0112035 | A1 | 4/2018  | Rizo et al. |

FOREIGN PATENT DOCUMENTS

| EP | 1627897 A1 | 2/2006 |
| EP | 2455426 A1 | 5/2012 |
| KR | 2015-0074563 A | 7/2015 |
| WO | WO 2008/042500 A1 | 4/2008 |
| WO | WO 2010/076680 A1 | 7/2010 |
| WO | WO 2013/190474 A1 | 12/2013 |
| WO | 2016/151362 A1 | 9/2016 |
| WO | WO 2016/151362 A1 | 9/2016 |
| WO | WO 2016/174592 A1 | 11/2016 |
| WO | WO 2017/149457 A1 | 9/2017 |

OTHER PUBLICATIONS

Dixit et al.; "Morphology, miscibility and mechanical properties of PMMA/PC blends"; Journal Phase Transitions a Multinational Journal; vol. 82; 2009; p. 866-878 (abstract only).
Singh et al.; "Specific interactions in partially miscible polycarbonate (PC)/poly (methyl methacrylate) (PMMA) blends"; Chemical Physics Letters; vol. 486; Feb. 2010; p. 32-36 (abstract only).
Kyu et al.; "Immiscibility loop phase behavior of polycarbonate and poly(methyl methacrylate) blends"; Journal of Polymer Science Part C: Polymer Letters; vol. 27; Oct. 1989; p. 421-426 (abstract only).
European Patent Application No. 18201736.8; Extended Search Report; dated Mar. 29, 2019; 7 pages.
European Patent Application No. 18201793.9; Extended Search Report; dated Mar. 15, 2019; 6 pages.
http://web.rtpcompany.com/info/data/1800A/RTP1800A/RTP1800AFR.html; RTP Co.; © 2019; accessed Nov. 21, 2019; 3 pages.
European Patent Application No. 19204370.1; Extended Search Report; dated Nov. 25, 2019; 5 pages.
International Patent Application No. PCT/IB2019/059027; Int'l Search Report and the Written Opinion; dated Dec. 6, 2019; 13 pages.

* cited by examiner

*Primary Examiner* — Margaret G Moore
(74) *Attorney, Agent, or Firm* — BakerHostetler

(57) ABSTRACT

A thermoplastic composition includes: from about 5 wt % to about 70 wt % poly(methyl methacrylate) (PMMA); from about 15 wt % to about 50 wt % of a first poly(carbonate-siloxane) copolymer having a siloxane content of from about 35 wt % to about 45 wt %; and from about 10 wt % to about 45 wt % of a second poly(carbonate-siloxane) copolymer. The second poly(carbonate-siloxane) copolymer has a siloxane content of from about 15 wt % to about 25 wt % or from about 4 wt % to about 8 wt %.

20 Claims, No Drawings

HIGH DUCTILITY BLENDS OF PMMA AND POLYCARBONATE-SILOXANE COPOLYMER

RELATED APPLICATION(S)

The present application claims priority to and the benefit of European application no. EP18201793.9, filed Oct. 22, 2018, the entire disclosure of which is incorporated herein by this reference in its entirety.

FIELD OF THE DISCLOSURE

The present disclosure relates to thermoplastic compositions including poly(methyl methacrylate) and polycarbonate-siloxane copolymers.

BACKGROUND OF THE DISCLOSURE

Blends of poly(methyl methacrylate) (PMMA) and polycarbonate (PC) are the focus of many investigations. Attempts have been made to develop a melt processable, transparent PMMA-PC blend having an increased glass transition temperature (Tg), but have been largely unsuccessful. Such blends generally have high haze, or are opaque and immiscible. PMMA is an amorphous polymer having excellent optical properties, chemical resistance, and high tensile strength, but it is also brittle, has low elongation at break and has high water absorption. Blends of PMMA with PC would be expected to have improved flexibility which could be useful in electronic display applications, but suitable transparent blends including these polymers have not been developed.

These and other shortcomings are addressed by aspects of the disclosure.

SUMMARY

Aspects of the disclosure relate to thermoplastic compositions including: from about 5 wt % to about 70 wt % poly(methyl methacrylate) (PMMA); from about 15 wt % to about 50 wt % of a first poly(carbonate-siloxane) copolymer having a siloxane content of from about 35 wt % to about 45 wt %; and from about 10 wt % to about 45 wt % of a second poly(carbonate-siloxane) copolymer. The second poly(carbonate-siloxane) copolymer has a siloxane content of from about 15 wt % to about 25 wt % or from about 4 wt % to about 8 wt %.

DETAILED DESCRIPTION

The present disclosure relates to transparent blends of PMMA, a first PC-siloxane copolymer that includes a relatively high siloxane content (about 25-45 wt % siloxane in the copolymer), and a second PC-siloxane copolymer that includes a lower siloxane content (about 15-25 wt %). Thermoplastic compositions including the PC—Si copolymers may be blended with PMMA to produce blends with good impact and ductility properties across a wide range of polymer ratios. This is in contrast to conventional general purpose PMMA, which is brittle. Specific aspects of the disclosure relate to a thermoplastic composition including: from about 5 wt % to about 70 wt % poly(methyl methacrylate) (PMMA); from about 15 wt % to about 50 wt % of a first poly(carbonate-siloxane) copolymer having a siloxane content of from about 35 wt % to about 45 wt %; and from about 10 wt % to about 45 wt % of a second poly(carbonate-siloxane) copolymer. The second poly(carbonate-siloxane) copolymer has a siloxane content of from about 15 wt % to about 25 wt % or from about 4 wt % to about 8 wt %.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used herein "Si content" or "X % Si" refers to the siloxane content of the component (e.g., the PC—Si copolymer) or composition.

As used in the specification and the appended claims, the singular forms "a," "an" and "the" include plural referents unless the context clearly dictates otherwise. Thus, for example, reference to "a poly(methyl methacrylate)" includes compositions including two or more poly(methyl methacrylates).

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions Including PMMA and PC—Si Copolymer

Aspects of the disclosure relate to thermoplastic compositions including: (a) from about 5 wt % to about 70 wt % poly(methyl methacrylate) (PMMA); (b) from about 15 wt % to about 50 wt % of a first poly(carbonate-siloxane) copolymer having a siloxane content of from about 35 wt % to about 45 wt %; and (c) from about 10 wt % to about 45 wt % of a second poly(carbonate-siloxane) copolymer having a siloxane content of from about 15 wt % to about 25 wt % or from about 4 wt % to about 8 wt %. The inclusion of at least two poly(carbonate-siloxane) copolymers, one having a relatively high siloxane content of from about 35-45 wt % and another having a lower siloxane content of from about 15-25 wt % or from about 4-8 wt %, has been found to result in thermoplastic compositions having good impact strength and ductility properties as compared to compositions including only the 35-45 wt % siloxane copolymer.

In some aspects the first poly(carbonate-siloxane) copolymer has a siloxane content of about 40 wt %. In further aspects the second poly(carbonate-siloxane) copolymer has a siloxane content of about 20 wt %. In other aspects the second poly(carbonate-siloxane) copolymer has a siloxane content of about 6 wt %.

Any suitable PMMA polymer may be used in the composition. Exemplary PMMA polymers include, but are not limited to, Acrylite® POQ66 available from Evonik, Plexiglas® V920A available from Arkema, and combinations thereof.

The poly(carbonate-siloxane) copolymers include carbonate units and siloxane units. Suitable carbonate units are shown in formula (1)

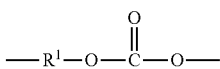
(1)

wherein at least 60 percent of the total number of $R^1$ groups is aromatic, or each $R^1$ contains at least one $C_{6-30}$ aromatic group. A combination of different $R^1$ groups can be present. The carbonate units can be derived from a dihydroxy compound such as an aromatic dihydroxy compound of formula (2) or a bisphenol of formula (3)

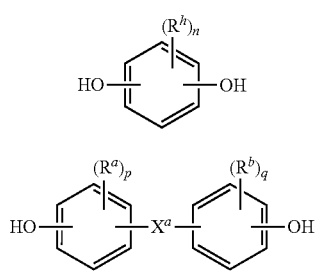

wherein in formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4; and in formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen.

In an aspect in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In still other aspects in formula (2), p and q is each 0, or p and q is each 1, and $R^a$ and $R^b$ are each a $C_{1-3}$ alkyl group, preferably methyl, disposed meta to the hydroxy group on each arylene group; $X^a$ is a bridging group connecting the two hydroxy-substituted aromatic groups, where the bridging group and the hydroxy substituent of each $C_6$ arylene group are disposed para to each other on the $C_6$ arylene group, and $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene; or a group of the formula —C(=$R^e$)— wherein $R^e$ is a divalent $C_{1-12}$ hydrocarbon group.

Examples of diphenols (2) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination comprising different diphenol compounds can be used.

Examples of bisphenols (3) include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 2,7-dihydroxycarbazole, or the like. A combination comprising different bisphenol compounds can be used.

Specific dihydroxy compounds include resorcinol, 2,2-bis (4-hydroxyphenyl) propane (bisphenol A or BPA), 3,3-bis (4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxyphenyl)-3,3,5-trimethylcyclohexane (TMC bisphenol).

In an aspect of formula (2), $R^a$ and $R^b$ are each independently $C_{1-6}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In more preferred aspect, the bisphenol polycarbonate is a bisphenol A polycarbonate homopolymer, also referred to as bisphenol A homopolycarbonate, which has repeating structural carbonate units of formula (1a).

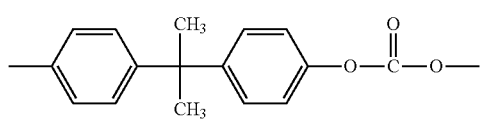
(1a)

Such linear homopolymers containing bisphenol A carbonate units (BPA-PC) include those commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC.

The siloxane units (also referred to as polysiloxane blocks) are optionally of formula (4)

(4)

wherein each R is independently a $C_{1-13}$ monovalent organic group. For example, R can be a $C_{1-13}$ alkyl, $C$-$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an aspect, where a transparent poly(carbonate-siloxane) is desired, R is unsubstituted by halogen. A combination of the foregoing R groups can be used in the same poly(carbonate-siloxane).

In an aspect, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another aspect, each R is independently methyl, trifluoromethyl, or phenyl.

The value of E in formula (4) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane)s can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an aspect, the siloxane units are of formula (5)

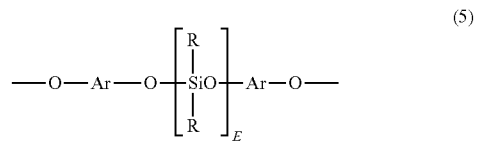

(5)

wherein E is as defined for formula (4); each R can be the same or different, and is as defined for formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (2) or formula (3). Exemplary dihydroxy compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (6a) and (6b)

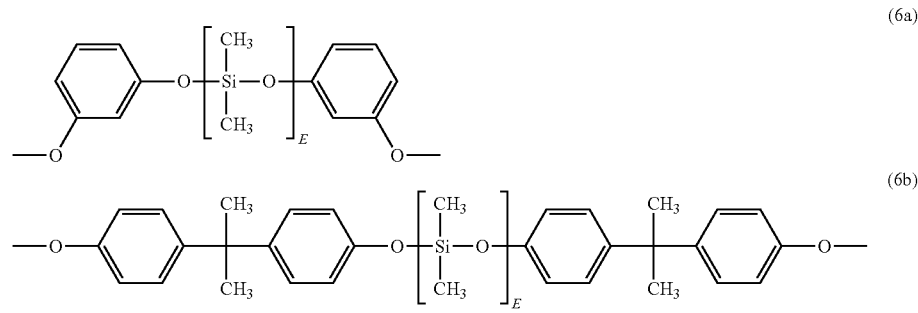

wherein E is as described in Formula (4). In an aspect, E has an average value of 10 to 80 or 10 to 40, and in still another aspect, E has an average value of 40 to 80, or 40 to 70.

In another aspect, the siloxane units are of formula (7)

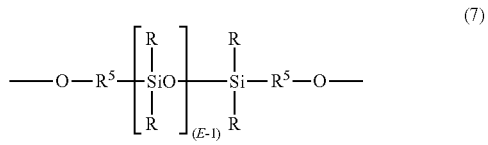

(7)

wherein R and E are as described for formula (4), and each $R^5$ is independently a divalent $C_{1-30}$ hydrocarbylene group, and wherein the polymerized polysiloxane unit is the reaction residue of its corresponding dihydroxy compound. In a specific aspect, the polydiorganosiloxane blocks are of formula (8):

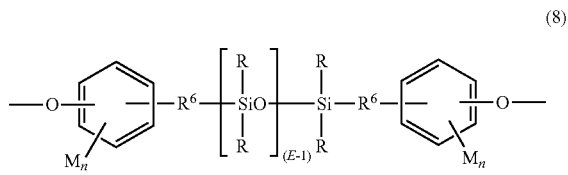
(8)

wherein R and E are as defined for formula (5). $R^6$ in formula (8) is a divalent $C_{2-8}$ aliphatic group. Each M in formula (8) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy, wherein each n is independently 0, 1, 2, 3, or 4.

In an aspect in formula (8), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another aspect in formula (8), R is methyl, or a combination of methyl and trifluoropropyl, or a combination of methyl and phenyl. In still another aspect in formula (8), R is methyl, M is methoxy, n is one, and $R^6$ is a divalent $C_{1-3}$ aliphatic group. Preferred polydiorganosiloxane blocks are of the formulas total weight of the poly(carbonate-siloxane). In some aspects the second poly(carbonate-siloxane) can have a siloxane content of 15 to 25 wt %, or about 20 wt %, based on the total weight of the poly(carbonate-siloxane). In further aspects the second poly(carbonate-siloxane) can have a siloxane content of 4 to 8 wt %, or about 6 wt %, based on the total weight of the poly(carbonate-siloxane). As used herein, "siloxane content" of the poly(carbonate-siloxane) means the content of siloxane units based on the total weight of the poly(siloxane-carbonate). The poly(carbonate-siloxane) can have a weight average molecular weight of 26,000 to 45,000 Da, or 30,000 to 43,000 Da, or 35,000 to 40,000 Da as measured by gel permeation chromatography using a crosslinked styrene-divinyl benzene column, at a sample concentration of 1 milligram per milliliter, and as calibrated with bisphenol A polycarbonate standards. In other aspects, the poly(carbonate-siloxane) can have a weight average molecular weight of 10,000 to 100,000 Da, or 50,000 to 100,000 Da.

The poly(carbonate-siloxane) copolymers can be transparent and can be combined with various colorants including colored flakes and the like to give objects with fluorescent, phosphorescent, reflective, and sparkle appearance. Pigments and dyes that change color at different temperatures may also be used in combination with the copolymer.

In some aspects the thermoplastic composition is flexible. Flexibility can include, but is not limited to, compositions having a Notched Izod ductility at 23° C. of 100% as tested in accordance with ASTM D256.

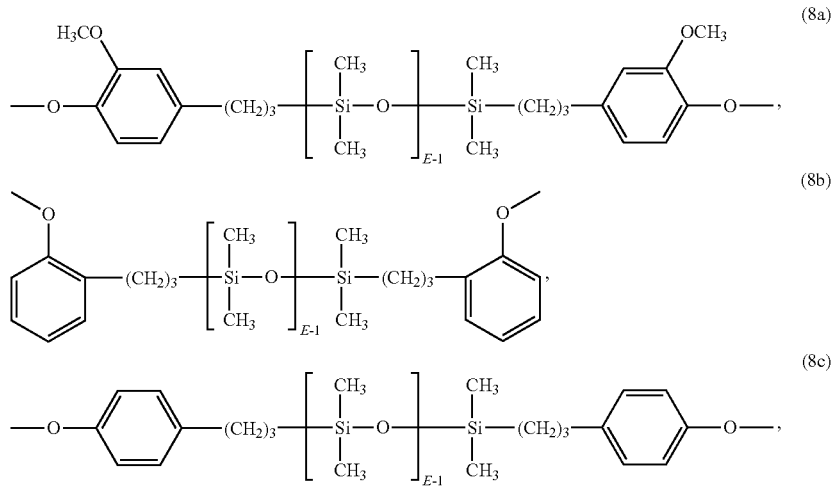

or a combination thereof, wherein E has an average value of 10 to 100, preferably 20 to 60, more preferably 30 to 50, or 40 to 50.

In an aspect, the poly(carbonate-siloxane) comprises carbonate units derived from bisphenol A, and repeating siloxane units (8a), (8b), (8c), or a combination thereof (preferably of formula 7a), wherein E has an average value of E has an average value of 10 to 100, or 20 to 60, or 30 to 60, or 40 to 60. In an aspect, the poly(carbonate-siloxane)s comprise carbonate units derived from bisphenol A and repeating siloxane units of formula (8a) (8b), or (8c), wherein E has an average value of 10 to 100, or 20 to 60, or 30 to 50, or 40 to 50.

The first poly(carbonate-siloxane) can have a siloxane content of 35 to 45 wt %, or about 40 wt %, based on the In certain aspects the composition further includes one or more additional polymers. Suitable additional polymers include, but are not limited to, low density polyethylene, poly(ethylene-propylene), styrene-butadiene rubber, polybutadiene, poly(butyl acrylate), silicone rubber, polyamide, polyaramide, polycarbonate, polyester, polyimide, polyetherimide, polystyrene, polyurethane, blends thereof, copolymers thereof, and combinations thereof.

In some aspects the composition further includes one or more additional additives. Suitable additional additives include, but are not limited to, fillers, pigments, whitening agents, optical brighteners, surfactants, processing aids, thermal stabilizers, photochemical stabilizers, and combinations thereof.

The thermoplastic composition including the PMMA, the first poly(carbonate-siloxane) copolymer and the second poly(carbonate-siloxane copolymer) may in some aspects have a notched Izod impact strength as measured in accordance with ASTM D256 at 23° C. that is higher than that of a substantially identical reference composition that does not include the second poly(carbonate-siloxane) copolymer but that includes the same overall siloxane content. In particular aspects the thermoplastic composition has a notched Izod impact strength as measured in accordance with ASTM D256 at 23° C. that is at least about 20% higher, or at least about 50% higher, or at least about 100% higher, or at least about 150% higher, or at least about 200% higher, or at least about 250% higher, or at least about 300% higher, or at least about 350% higher, or at least about 400% higher, than that of a substantially identical reference composition that does not include the second poly(carbonate-siloxane) copolymer but that includes the same overall siloxane content.

As used herein, a "substantially identical reference composition" is a composition that includes the same components as the example composition, except that the reference composition does not include the recited component (e.g., the second poly(carbonate-siloxane) copolymer is omitted). Where the composition is said to include the same overall siloxane content, the amount of the PMMA and the first poly(carbonate-siloxane) copolymer are adjusted so that the overall siloxane content of the reference composition is the same. Thus, and purely by way of example, if an example composition includes 40 wt % PMMA, 30 wt % of a first poly(carbonate-siloxane) copolymer having a siloxane content of 40 wt %, and 30 wt % of a second poly(carbonate-siloxane) copolymer having a siloxane content of 20 wt %, a substantially identical reference composition that does not include the second poly(carbonate-siloxane) copolymer but that includes the same overall siloxane content includes 55 wt % PMMA and 45 wt % of the first poly(carbonate-siloxane) copolymer. The overall siloxane content of each of the example and reference compositions is 18 wt %.

In some aspects the thermoplastic composition including the PMMA, the first poly(carbonate-siloxane) copolymer and the second poly(carbonate-siloxane) copolymer) has a percent elongation at break as measured in accordance with ASTM D638 that is higher than that of a substantially identical reference composition that does not include the second poly(carbonate-siloxane) copolymer but that includes the same overall siloxane content. In further aspects the thermoplastic composition including the PMMA, the first poly(carbonate-siloxane) copolymer and the second poly(carbonate-siloxane) copolymer) has a percent elongation at break as measured in accordance with ASTM D638 that is at least about 5% higher, or at least about 10% higher, or at least about 20% higher, or at least about 50% higher, or at least about 100% higher, or at least about 150% higher, or at least about 200% higher, or at least about 2500% higher, or at least about 300% higher, than that of a substantially identical reference composition that does not include the second poly(carbonate-siloxane) copolymer but that includes the same overall siloxane content.

The thermoplastic composition may in some aspects have a nano-dispersed poly(carbonate-siloxane) copolymer phase in the PMMA and a single glass transition temperature (Tg).

When light falls on a material, some is transmitted, some is reflected, and some is absorbed. The transmittance is the ratio of the light passing through to the light incident on the material. Light transmission through transparent PMMA-PC blended materials depends on the angle of incidence and the wavelength of light.

Haze is commonly referred to as the "milkiness" or "cloudiness" of an otherwise transparent polymer, or its loss in contrast. The appearance of haze is caused by light being scattered by the surface imperfections, or by inhomogeneities in the material due to voids, large crystallites, incompletely dissolved additives, or cross-linked material. Haze is defined as the percentage of transmitted light which, in passing through the specimen, deviates by more than an average of 2.5 degrees from an incident parallel beam by forward scattering from both surfaces and from within the specimen Transmittance and haze may be measured according to ASTM D 1003-61, which is incorporated herein by reference in its entirety for all purposes. It may also be measured according to DIN 5036, ASTM E179, or ISO 13468. Instruments used in measuring transmittance and haze include a hazemeter or a spectrophotometer such as a BYK Gardner "Haze Gard Plus" instrument (BYK-Gardner USA, Columbia, Md.).

Yellowness index (YI) is a measure of the tendency of plastics to turn yellow upon long-term exposure to light. Yellowness is a number calculated from spectrophotometric data that describes the change in color of a test sample from clear or white to yellow. Yellowness can be evaluated by measuring the Blue to Yellow span (B—Y span) of the thermoplastic composition using a spectrophotometer such as the BYK Gardner Spectrophotometer. The B—Y span is defined as the difference in the values of the yellowness index of transmission according to ASTM E313 and the yellowness index of reflection. The yellowness of index of reflection is measured using the same equipment and parameters as the yellowness index of transmission except that the equipment employs the reflection setting.

Articles Including the Thermoplastic Composition

Aspects of the disclosure also relate to articles including the thermoplastic composition described herein. In some aspects the article is a film, a sheet, a molded article, a welded article, a filament or a powder. In particular aspects the article is a film for a consumer electronics device.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of or consisting essentially of:

from about 5 wt % to about 70 wt % poly(methyl methacrylate) (PMMA);

from about 15 wt % to about 50 wt % of a first poly(carbonate-siloxane) copolymer having a siloxane content of from about 35 wt % to about 45 wt %; and from about 10 wt % to about 45 wt % of a second poly(carbonate-siloxane) copolymer, wherein the second poly(carbonate-siloxane) copolymer has a siloxane content of from about 15 wt % to about 25 wt % or from about 4 wt % to about 8 wt %.

Aspect 2. The thermoplastic composition according to Aspect 1, wherein the first poly(carbonate-siloxane) copolymer has a siloxane content of about 40 wt %.

Aspect 3. The thermoplastic composition according to Aspect 1 or 2, wherein the second poly(carbonate-siloxane) copolymer has a siloxane content of about 20 wt %.

Aspect 4. The thermoplastic composition according to Aspect 1 or 2, wherein the second poly(carbonate-siloxane) copolymer has a siloxane content of about 6 wt %.

Aspect 5. The thermoplastic composition according to any of Aspects 1 to 4, wherein the composition comprises from about 30 wt % to about 45 wt % of the first poly(carbonate-siloxane) copolymer and from about 25 wt % to about 40 wt % of the second poly(carbonate-siloxane) copolymer.

Aspect 6. The thermoplastic composition according to any of Aspects 1 to 5, wherein the composition has a transmission of about 30% to about 50%.

Aspect 7. The thermoplastic composition according to any of Aspects 1 to 6, wherein the composition has a Notched Izod ductility of 100% as determined in accordance with ASTM D256.

Aspect 8. The thermoplastic composition according to any of Aspects 1 to 7, wherein the composition further comprises one or more additional polymers.

Aspect 9. The thermoplastic composition according to Aspect 8, wherein the one or more additional polymers are selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof; copolymers thereof; and combinations thereof.

Aspect 10. The thermoplastic composition according to any of Aspects 1 to 9, wherein the composition further comprises one or more additional additives.

Aspect 11. The thermoplastic composition according to Aspect 10, wherein the one or more additional additives is selected from the group consisting of: a filler; a pigment; a whitening agent; an optical brightener; a surfactant; a processing aid; a thermal stabilizer; a photochemical stabilizer; and combinations thereof.

Aspect 12. The thermoplastic composition according to any of Aspects 1 to 11, wherein the composition has a percent elongation at break as measured in accordance with ASTM D638 that is higher than that of a substantially identical reference composition that does not include the second poly(carbonate-siloxane) copolymer but that includes the same overall siloxane content.

Aspect 13. The thermoplastic composition according to any of Aspects 1 to 12, wherein the composition has a nano-dispersed poly(carbonate-siloxane) copolymer phase in the PMMA and a single glass transition temperature (Tg).

Aspect 14. An article comprising the thermoplastic composition according to any of Aspects 1 to 13.

Aspect 15. The article according to Aspect 14, wherein the article comprises a film, a sheet, a molded article, a welded article, a filament or a powder.

Aspect 16. The article according to Aspect 14, wherein the article is a film for a consumer electronics device.

Aspect 17. The thermoplastic composition according to any of Aspects 1 to 13, wherein the composition has a percent haze value of about 10% to 50% as measured in accordance with ASTM D 1003-61.

Aspect 18. The thermoplastic composition according to any of Aspects 1 to 13, wherein the composition has a yellowness index of about 40 to about 45 as measured in accordance with ASTM E313.

Aspect 19. The thermoplastic composition according to any of Aspects 1 to 13, wherein the composition has an Izod impact strength of about 350 to about 800 J/m as determined in accordance with ASTM D256.

Aspect 20. The thermoplastic composition according to any of Aspects 1 to 13, wherein the composition has tensile strength of about 30 MPa to about 60 MPa as determined in accordance with ASTM D 638.

Aspect 21. The thermoplastic composition according to any of Aspects 1 to 13, wherein the composition has a modulus of elasticity of about 1600 MPa to about 2050 MPa as determined in accordance with ASTM D 638.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Compositions described herein included materials set forth below in Table 1:

Table 1

| Materials | |
|---|---|
| Component | Source |
| PMMA Plexiglas ® V920A | Arkema |
| PC-Siloxane copolymer (40% siloxane content) | SABIC |
| PC-Siloxane copolymer (20% siloxane content) C9030P | SABIC |

Example Compositions

Extruded example and comparative compositions were made as set forth below in Tables 2A, 2B, 3A and 3B:

TABLE 2A

| Effect of Varying Copolymer Siloxane Content | | | | | | | |
|---|---|---|---|---|---|---|---|
| Component | Unit | C2 | Ex2.1 | Ex2.2 | Ex2.3 | Ex2.4 | Ex2.5 |
| PMMA, Plexiglas ® V920A | % | 99.6 | 84.6 | 69.6 | 54.6 | 54.6 | 9.6 |
| PC-Si copolymer (60% Si content) | % | | 15.0 | 30.0 | 22.5 | | |
| PC-Si copolymer (40% Si content) | % | | | | | | |

TABLE 2A-continued

Effect of Varying Copolymer Siloxane Content

| Component | Unit | C2 | Ex2.1 | Ex2.2 | Ex2.3 | Ex2.4 | Ex2.5 |
|---|---|---|---|---|---|---|---|
| PC-Si copolymer (20% Si content) | % | | | | 22.5 | 45.0 | 90.0 |
| Hindered Phenol Stabilizer | % | 0.3 | 0.3 | 0.3 | 0.3 | 0.3 | 0.3 |
| Phosphite Stabilizer | % | 0.1 | 0.1 | 0.1 | 0.1 | 0.1 | 0.1 |
| Formulation Total | % | 100 | 100 | 100 | 100 | 100 | 100 |
| Overall Siloxane Content | % | 0 | 9 | 18 | 18 | 9 | 18 |
| YI, % T and Haze by spectroscopy, GEP Method | | | | | | | |
| Yellowness Index - Avg | — | 1.3 | 8.6 | 13.2 | 60.3 | 64.9 | 70.3 |
| % Transmission - Avg | % | 91.2 | 39.0 | 43.6 | 40.0 | 20.1 | 18.8 |
| % Haze - Avg | % | 3.1 | 98.9 | 98.4 | 82.4 | 99.2 | 99.2 |
| Izod Impact - ASTM D256, ASTM D4812, 23° C. | | | | | | | |
| Ductility | % | 0 | 0 | 0 | 0 | 0 | 100 |
| Impact Strength-Avg | J/m | 24.2 | 40.2 | 56.8 | 128.0 | 108.0 | 618.0 |
| Izod Impact - ASTM D256, ASTM D4812, 0° C. | | | | | | | |
| Ductility | % | X | X | X | X | X | 100.0 |
| Impact Strength-Avg | J/m | X | X | X | X | X | 547.0 |
| Izod Impact - ASTM D256, ASTM D4812, −20° C. | | | | | | | |
| Ductility | % | X | X | X | X | X | 100.0 |
| Impact Strength-Avg | J/m | X | X | X | X | X | 482.0 |
| Heat deflection temperature (HDT) - ASTM D 648 | | | | | | | |
| Stress | MPa | 0.455 | 0.455 | 0.455 | 0.455 | 0.455 | 0.455 |
| Thickness | mm | 3.175 | 3.175 | 3.175 | 3.175 | 3.175 | 3.175 |
| Deflection temp-Avg | ° C. | 92.5 | 89.9 | 88.7 | 90.8 | 101.2 | 120.5 |
| Tensile properties - ASTM D 638, Uniaxial tensile test | | | | | | | |
| Modulus of Elasticity-Avg | MPa | 3186.0 | 2698.0 | 2260.0 | 1698.0 | 2380.0 | 1706.0 |
| Tensile Strength at Yield-Avg | MPa | 70.6 | 58.8 | 48.1 | 38.5 | 55.7 | 31.6 |
| Tensile Strength at Break-Avg | MPa | 69.0 | 44.2 | 39.0 | 36.1 | 45.6 | 18.4 |
| % Elongation at Yield-Avg | % | 5.87 | 5.54 | 5.48 | 7.35 | 5.47 | 3.81 |
| % Elongation at Break-Avg | % | 7.04 | 28.32 | 30.62 | 73.63 | 32.64 | 4.58 |

TABLE 2B

Effect of Varying Copolymer Siloxane Content

| Component | Unit | C2 | Ex2.6 | Ex2.7 | Ex2.8 | Ex2.9 |
|---|---|---|---|---|---|---|
| PMMA, Plexiglas ® V920A | % | 99.6 | 77.1 | 59.6 | 54.6 | 39.6 |
| PC-Si copolymer (60% Si content) | % | | | | | |
| PC-Si copolymer (40% Si content) | % | | 22.5 | 40 | 45.0 | 30.0 |
| PC-Si copolymer (20% Si content) | % | | | | | 30.0 |
| Hindered Phenol Stabilizer | % | 0.3 | 0.3 | 0.3 | 0.3 | 0.3 |

TABLE 2B-continued

Effect of Varying Copolymer Siloxane Content

| Component | Unit | C2 | Ex2.6 | Ex2.7 | Ex2.8 | Ex2.9 |
| --- | --- | --- | --- | --- | --- | --- |
| Phosphite Stabilizer | % | 0.1 | 0.1 | 0.1 | 0.1 | 0.1 |
| Formulation Total | % | 100 | 100 | 100 | 100 | 100 |
| Overall Siloxane Content | % | 0 | 9 | 16 | 18 | 18 |
| YI, % T and Haze by spectroscopy, GEP Method | | | | | | |
| Yellowness Index - Avg | — | 1.3 | 21.7 | 26.8 | 31.4 | 45.4 |
| % Transmission - Avg | % | 91.2 | 81.8 | 79.5 | 76.3 | 43.6 |
| % Haze - Avg | % | 3.1 | 12.9 | 15.8 | 57.7 | 88.3 |
| Izod Impact - ASTM D256, ASTM D4812, 23° C., Notched | | | | | | |
| Ductility | % | 0 | 0 | 0 | 0 | 100 |
| Impact Strength-Avg | J/m | 24.2 | 83.5 | 120.0 | 148.0 | 216.0 |
| Izod Impact - ASTM D256, ASTM D4812, 0° C., Notched | | | | | | |
| Ductility | % | X | X | X | X | 100.0 |
| Impact Strength-Avg | J/m | X | X | X | X | 183.0 |
| Izod Impact - ASTM D256, ASTM D4812, −20° C., Notched | | | | | | |
| Ductility | % | X | X | X | X | 0.0 |
| Impact Strength-Avg | J/m | X | X | X | X | 167.0 |
| Heat deflection temperature (HDT) - ASTM D 648 | | | | | | |
| Stress | MPa | 0.455 | 0.455 | 0.455 | 0.455 | 0.455 |
| Thickness | mm | 3.175 | 3.175 | 3.175 | 3.175 | 3.175 |
| Deflection temp-Avg | ° C. | 92.5 | 92.6 | 94.5 | 91.3 | 102.2 |
| Tensile properties - ASTM D 638, Uniaxial tensile test | | | | | | |
| Modulus of Elasticity-Avg | MPa | 3186.0 | 2416.0 | 2000.0 | 1504.0 | 1876.0 |
| Tensile Strength at Yield-Avg | MPa | 70.6 | 53.0 | 44.9 | 35.5 | 45.5 |
| Tensile Strength at Break-Avg | MPa | 69.0 | 43.8 | 37.8 | 34.5 | 41.7 |
| % Elongation at Yield-Avg | % | 5.87 | 5.36 | 5.75 | 5.91 | 5.64 |
| % Elongation at Break-Avg | % | 7.04 | 23.7 | 28.47 | 75.2 | 92.28 |

Numerous observations can be made from this data. Example compositions including PC—Si copolymer (40% Si content) had substantially improved transmission and haze properties as compared to compositions without the 40% PC—Si copolymer. Compare Ex2.6, Ex2.7 and Ex2.8 (with the 40% Si copolymer) to Ex2.1, Ex2.2 (each with only 60% Si copolymer), Ex2.4, Ex2.5 (each with only 20% Si copolymer) and Ex2.3 (with both 60% and 20% Si copolymer). These results are observed even when the total siloxane content in the composition was the same: compare Ex2.6 with Ex2.1 and Ex2.4 (all samples have 9% total Si content), Ex2.8 to Ex2.2 and Ex2.5 (each sample has 18% total siloxane content). Thus, the siloxane content of the starting PC—Si copolymer affects the properties of the PMMA/PC—Si composition more so than the final siloxane content of the composition.

It was also observed that when a composition included both a 40% PC—Si copolymer and a 20% PC—Si copolymer (see Ex2.9), transmission decreased and haze increased (although they were still substantially improved as compared to the compositions including only the 20% PC—Si copolymer, see Ex2.4 and Ex2.5). Significantly, however, the notched Izod impact strength, ductility, elongation at break and HDT were all improved as compared to the examples including only the 40% PC—Si copolymer (compare Ex2.9 to Ex2.6, Ex2.7 and Ex2.8). This trade-off of decreased transparency properties for improved tensile and flexibility properties may be desirable in certain applications. Again, these results were observed even when the overall siloxane content of the compositions was the same. Compare Ex2.9 to Ex2.8 (both compositions have 18% total siloxane content).

Additional compositions were prepared to determine how the relative amounts of 40% PC—Si copolymer and 20% PC—Si copolymer affect the properties of the thermoplastic composition. Results are shown in Tables 3A and 3B:

TABLE 3A

Effect of Varying Copolymer Siloxane Content

| Component | Unit | C3 | Ex3.1 | Ex3.2 | Ex.3.3 | Ex.3.4 | Ex3.5 | Ex3.6 |
|---|---|---|---|---|---|---|---|---|
| PMMA, Plexiglas ® V920A | % | 99.6 | 44.2 | 29.6 | 44.6 | 55.8 | 67.0 | 68.0 |
| PC-Si copolymer (40% Si content) | % | | 30.8 | 30.0 | 15.0 | 31.7 | 15.0 | 31.6 |
| PC-Si copolymer (20% Si content) | % | | 24.6 | 40.0 | 40.0 | 12.1 | 17.6 | |
| Hindered Phenol Stabilizer | % | 0.3 | 0.3 | 0.3 | 0.3 | 0.3 | 0.3 | 0.3 |
| Phosphite Stabilizer | % | 0.1 | 0.1 | 0.1 | 0.1 | 0.1 | 0.1 | 0.1 |
| Formulation Total | % | 100 | 100 | 100 | 100 | 100 | 100 | 100 |
| Overall Siloxane Content | % | 0 | 17.2 | 20.0 | 14.0 | 15.1 | 9.5 | 12.6 |
| Melt Mass-flow Rate (MFR) (avg), ASTM D 1238 according to Global Test Method, 300° C., 1.2 Kg load, 360 s dwell time | g/10 min | 2.78 | 1.4 | 5.81 | 7.46 | 24.0 | 14.5 | 2.78 |
| Melt Volume-flow Rate (MVR) (avg), IS01133 according to Global Test Method, 300° C., 1.2 kg load | cm³/10 min | 2.65 | 1.53 | 5.94 | 7.86 | 24.6 | 13.89 | 2.65 |
| YI-01-GEP-GLB-MTV | | | | | | | | |
| Yellowness Index - Avg | — | 1.3 | 35.4 | 47.3 | 56.2 | 39.2 | 44.5 | 29.4 |
| % Transmission - Avg | % | 91.2 | 47.3 | 37.8 | 27.8 | 47.6 | 37.9 | 78.4 |
| % Haze - Avg | % | 3.1 | 88.0 | 98.0 | 99.2 | 98.3 | 99.2 | 61.1 |
| Heat deflection temperature (HDT) - ASTM D 648 | | | | | | | | |
| Stress | MPa | 0.455 | 0.455 | 0.455 | 0.455 | 0.455 | 0.455 | 0.455 |
| Thickness | mm | 3.175 | 3.175 | 3.175 | 3.175 | 3.175 | 3.175 | 3.175 |
| Deflection temp-Avg | °C. | 92.5 | 103.9 | 105.5 | 104.1 | 95.0 | 93.8 | 89.0 |
| Heat deflection temperature (HDT) - ASTM D 648 | | | | | | | | |
| Stress | MPa | 1.82 | 1.82 | 1.82 | 1.82 | 1.82 | 1.82 | 1.82 |
| Thickness | mm | 3.175 | 3.175 | 3.175 | 3.175 | 3.175 | 3.175 | 3.175 |
| Deflection temp-Avg | °C. | 79.4 | 88.8 | 91.1 | 89.5 | 81.0 | 82.9 | 75.2 |
| Izod Impact - ASTM D256, ASTM D4812, 23° C., Notched | | | | | | | | |
| Ductability | % | 0.0 | 0.0 | 100.0 | 0.0 | 0.0 | 0.0 | 0.0 |
| Impact Strength-Avg | J/m | 24.2 | 234.0 | 369.0 | 222.0 | 135.0 | 107.0 | 86.6 |
| Izod Impact - ASTM D256, ASTM D4812, 0° C., Notched | | | | | | | | |
| Ductability | % | X | X | 0.0 | X | X | X | X |
| Impact Strength-Avg | J/m | X | X | 322.0 | X | X | X | X |
| Izod Impact - ASTM D256, ASTM D4812, −20° C., Notched | | | | | | | | |
| Ductability | % | X | X | X | X | X | X | X |
| Impact Strength-Avg | J/m | X | X | X | X | X | X | X |
| Izod Impact - ASTM D256, ASTM D4812, −40° C., Notched | | | | | | | | |
| Ductability | % | X | X | X | X | X | X | X |
| Impact Strength-Avg | J/m | X | X | X | X | X | X | X |
| Tensile properties - ASTM D 638, Uniaxial tensile test | | | | | | | | |
| Modulus of Elasticity-Avg | MPa | 31.86.0 | 1678.0 | 1642.5 | 1946.0 | 1700.0 | 2026.0 | 1796.0 |
| Tensile Strength at Yield-Avg | MPa | 70.6 | 42.7 | 41.3 | 47.9 | 39.9 | 46.5 | 40.8 |
| Tensile Strength at Break-Avg | MPa | 69.0 | 40.5 | 36.1 | 45.0 | 37.7 | 40.2 | 37.3 |
| % Elongation at Yield-Avg | % | 5.87 | 5.79 | 5.4 | 5.51 | 5.89 | 5.36 | 4.93 |
| % Elongation at Break-Avg | % | 7.04 | 102.26 | 88.01 | 110.48 | 74.34 | 55.85 | 53.57 |
| Vicat softening temperature (VST) (avg), ASTM D 1525, 10.0 N load, 120° C./hour temp rate | °C. | 110.0 | 123.0 | 132.0 | 126.0 | 114.0 | 113.0 | 110.0 |

TABLE 3B

Effect of Varying Copolymer Siloxane Content

| Component | Unit | C3 | Ex3.7 | Ex3.8 | Ex3.9 | Ex3.10 | Ex3.11 | Ex3.12 |
|---|---|---|---|---|---|---|---|---|
| PMMA, Plexiglas ® V920A | % | 99.6 | 29.7 | 44.2 | 54.3 | 14.6 | 80.8 | 54.6 |
| PC-Si copolymer (40% Si content) | % |  | 45.0 | 30.8 | 18.5 | 45.0 | 18.8 | 45.0 |
| PC-Si copolymer (20% Si content) | % |  |  | 24.9 | 24.6 | 26.8 | 40.0 |  |
| Hindered Phenol Stabilizer | % | 0.3 | 0.3 | 0.3 | 0.3 | 0.3 | 0.3 | 0.3 |
| Phosphite Stabilizer | % | 0.1 | 0.1 | 0.1 | 0.1 | 0.1 | 0.1 | 0.1 |
| Formulation Total | % | 100 | 100 | 100 | 100 | 100 | 100 | 100 |
| Overall Siloxane Content | % | 0 | 23.0 | 17.2 | 12.8 | 26.0 | 7.5 | 18.0 |
| Melt Mass-flow Rate (MFR) (avg), ASTM D 1238 according to Global Test Method, 300° C., 1.2 Kg load, 360 s dwell time | g/10 min | 2.78 | 0.0 | 3.82 | 10.3 | 0.0 | 33.4 | 8.44 |
| Melt Volume-flow Rate (MVR) (avg), ISO1133 according to Global Test Method, 300° C., 1.2 Kg load YI-01-GEP-GLB-MTV | cm³/10 min | 2.65 | 0.0 | 4.27 | 9.94 | 0.0 | 35.5 | 8.97 |
| Yellowness Index - Avg | — | 1.3 | 40.0 | 45.1 | 51.0 | 45.2 | 17.1 | 31.4 |
| % Transmission - Avg | % | 91.2 | 47.2 | 39.0 | 33.0 | 43.3 | 84.3 | 76.3 |
| % Haze - Avg | % | 3.1 | 93.5 | 99.1 | 99.2 | 92.8 | 49.3 | 57.7 |
| Heat deflection temperature (HDT) - ASTM D 648 |  |  |  |  |  |  |  |  |
| Stress | MPa | 0.455 | 0.455 | 0.455 | 0.455 | X | 0.455 | 0.455 |
| Thickness | mm | 3.175 | 3.175 | 3.175 | 3.175 | X | 3.175 | 3.175 |
| Deflection temp- Avg | ° C. | 92.5 | 107.5 | 99.1 | 96.4 | X | 87.0 | 91.3 |
| Heat deflection temperature (HDT) - ASTM D 648 |  |  |  |  |  |  |  |  |
| Stress | MPa | 1.82 | 1.82 | 1.82 | 1.82 | X | 1.82 | 1.82 |
| Thickness | mm | 3.175 | 3.175 | 3.175 | 3.175 | X | 3.175 | 3.175 |
| Deflection temp- Avg | ° C. | 79.4 | 87.1 | 84.5 | 83.5 | X | 74.8 | 79.0 |
| Izod Impact - ASTM D256, ASTM D4812, 23° C., Notched |  |  |  |  |  |  |  |  |
| Ductility | % | 0.0 | 100.0 | 0.0 | 0.0 | 100.0 | 0.0 | 0.0 |
| Impact Strength- Avg | J/m | 24.2 | 413.0 | 206.0 | 152.0 | 777.0 | 45.6 | 148.0 |
| Izod Impact - ASTM D256, ASTM D4812, 0° C., Notched |  |  |  |  |  |  |  |  |
| Ductility | % | X | 100.0 | X | X | 100.0 | X | X |
| Impact Strength- Avg | J/m | X | 328.0 | X | X | 714.0 | X | X |
| Izod Impact - ASTM D256, ASTM D4812, |  |  |  |  |  |  |  |  |

TABLE 3B-continued

Effect of Varying Copolymer Siloxane Content

| Component | Unit | C3 | Ex3.7 | Ex3.8 | Ex3.9 | Ex3.10 | Ex3.11 | Ex3.12 |
|---|---|---|---|---|---|---|---|---|
| −20° C., Notched | | | | | | | | |
| Ductility | % | X | 100.0 | X | X | 100.0 | X | X |
| Impact Strength-Avg | J/m | X | 323.0 | X | X | 694.0 | X | X |
| Izod Impact - ASTM D256, ASTM D4812, −40° C., Notched | | | | | | | | |
| Ductility | % | X | 100.0 | X | X | 100.0 | X | X |
| Impact Strength-Avg | J/m | X | 293.0 | X | X | 631.0 | X | X |
| Tensile properties - ASTM D 638, Uniaxial tensile test | | | | | | | | |
| Modulus of Elasticity-Avg | MPa | 3186.0 | 1356.0 | 1646.0 | 1902.0 | 791.16 | 2148.0 | 1504.0 |
| Tensile Strength at Yield-Avg | MPa | 70.6 | 33.7 | 40.1 | 45.4 | 8.79 | 43.6 | 35.5 |
| Tensile Strength at Break-Avg | MPa | 69.0 | 30.7 | 39.2 | 40.6 | 2.11 | 42.5 | 34.5 |
| % Elongation at Yield-Avg | % | 5.87 | 5.67 | 6.14 | 5.88 | 1.33 | 3.36 | 5.91 |
| % Elongation at Break-Avg | % | 7.04 | 82.8 | 100.46 | 89.22 | 4.3 | 24.39 | 75.2 |
| Vicat softening temperature (VST) (avg), ASTM D 1525, 10.0 N load, 120° C./hour temp rate | ° C. | 110.0 | 128.0 | 122.0 | 117.0 | 133.0 | 105.0 | 113.0 |

As shown in the data, and consistent with the results shown in Tables 2A and 2B, the example compositions including both a 40% PC—Si copolymer and a 20% PC—Si copolymer (Ex3.1-Ex3.5 and Ex3.7-Ex3.10) had decreased % T and increased haze as compared to example compositions including only 40% PC—Si copolymer (Ex3.6, Ex3.11 and Ex3.12) or the comparative composition including only PMMA (C3). These compositions, however, had improved notched Izod impact strength, particularly at 23° C., elongation at break (except for Ex3.10 that had a total copolymer content of 85%) and Vicat softening temperature (VST). In addition, several of these examples had good ductility at 23° C. (see Ex3.2, Ex3.7 and Ex3.10). Accordingly, compositions including both a 40% PC—Si copolymer and a 20% PC—Si copolymer may be desirable in certain applications in which strength, ductility and high heat performance (as indicated by Vicat softening temperature) are desirable.

Further comparative and example compositions were formed to compare the effect of adding a 6 wt % PC—Si copolymer to the composition (i.e., as the second poly (carbonate-siloxane) copolymer). Comparative compositions which do not include any PC—Si copolymer are shown in Table 4A as C4.1 and C4.2; example compositions including different amounts of 6 wt % PC—Si copolymer are shown in Table 4A as Ex4.1 and Ex4.2. Other compositions described above are also included for comparison in Table 4A (C2) and Table 4B (Ex2.2, Ex2.3, Ex2.5, Ex2.9, and Ex3.12).

TABLE 4A

Effect of Adding Different Types of PC-Si Copolymer

| Components | | C2 | C4.1 | C4.2 | Ex4.1 | Ex4.2 |
|---|---|---|---|---|---|---|
| PMMA, Plexiglass V920A | % | 99.6 | 54.6 | 29.6 | 21.34 | 46.1 |
| PC-Si copolymer (60% Si content) | % | | | | | |
| PC-Si copolymer (40% Si content) | % | | | | 39.13 | 43.5 |
| PC-Si copolymer (20% Si content) | % | | | | | |
| PC-Si copolymer (6% Si content) | % | | | | 39.13 | 10 |
| PC Resin 130 Grade with PCP endcap | % | | 45 | 70 | | |
| Hindered Phenol Stabilizer | % | 0.3 | 0.3 | 0.3 | 0.3 | 0.3 |

TABLE 4A-continued

Effect of Adding Different Types of PC-Si Copolymer

| Components | | C2 | C4.1 | C4.2 | Ex4.1 | Ex4.2 |
|---|---|---|---|---|---|---|
| Phosphite Stabilizer | % | 0.1 | 0.1 | 0.1 | 0.1 | 0.1 |
| Overall siloxane content | % | — | — | — | 18 | 18 |
| Properties | | | | | | |
| YI, % T and Haze by spectroscopy, GEP Method | | | | | | |
| Yellowness Index - Avg | — | 1.3 | 58.2 | 56.3 | 39.1 | 35.5 |
| % Transmission - Avg | % | 91.2 | 6.3 | 7.9 | 31.2 | 47.7 |
| % Haze - Avg | % | 3.1 | 99.3 | 99.4 | 98.9 | 96.2 |
| Izod Impact, ASTM D256, ASTM D4812, 23° C., Notched | | | | | | |
| Ductility | % | 0 | 0.0 | 0.0 | 100.0 | 0.0 |
| Impact Strength-Avg | J/m | 24.2 | 61.1 | 146.0 | 341.0 | 161.0 |
| Izod Impact, ASTM D256, ASTM D4812, 0° C., Notched | | | | | | |
| Ductility | % | X | X | X | | X |
| Impact Strength-Avg | J/m | X | X | X | | X |
| Izod Impact, ASTM D256, ASTM D4812, −20° C., Notched | | | | | | |
| Ductility | % | X | X | X | | X |
| Impact Strength-Avg | J/m | X | X | X | X | |
| Heat deflection temperature (HDT) - ASTM D 648 | | | | | | |
| Stress | MPa | 0.455 | 0.455 | 0.455 | 0.455 | 0.455 |
| Thickness | mm | 3.175 | 3.175 | 3.175 | 3.175 | 3.175 |
| Deflection temp-Avg | ° C. | 92.5 | 109.1 | 132.2 | 113.3 | 102.1 |
| Tensile properties, ASTM D 638, Uniaxial tensile test | | | | | | |
| Modulus of Elasticity-Avg | MPa | 3186.0 | 2884.0 | 2602.0 | 2030.0 | 2034.0 |
| Tensile Strength at Yield-Avg | MPa | 70.6 | 75.8 | 71.6 | 55.3 | 49.7 |
| Tensile Strength at Break-Avg | MPa | 69.0 | 52.7 | 54.5 | 45.0 | 42.2 |
| % Elongation at Yield-Avg | % | 5.87 | 6.55 | 6.84 | 5.77 | 5.08 |
| % Elongation at Break-Avg | % | 7.04 | 52.73 | 37.48 | 50.16 | 50.12 |

TABLE 4B

Effect of Adding Different Types of PC-Si Copolymer

| Components | | Ex2.2 | Ex2.3 | Ex2.5 | Ex2.9 | Ex3.12 |
|---|---|---|---|---|---|---|
| PMMA, Plexiglass V920A | % | 69.6 | 54.6 | 9.6 | 39.6 | 54.6 |
| PC-Si copolymer (60% Si content) | % | 30.0 | 22.5 | | | |
| PC-Si copolymer (40% Si content) | % | | | | 30.0 | 45.0 |
| PC-Si copolymer (20% Si content) | % | | 22.5 | 90.0 | 30.0 | |
| PC-Si copolymer (6% Si content) | % | | | | | |
| PC Resin 130 Grade with PCP endcap | % | | | | | |
| Hindered Phenol Stabilizer | % | 0.3 | 0.3 | 0.3 | 0.3 | 0.3 |
| Phosphite Stabilizer | % | 0.1 | 0.1 | 0.1 | 0.1 | 0.1 |
| Overall siloxane content | % | 18 | 18 | 18 | 18 | 18 |
| Properties | | | | | | |
| YI, % T and Haze by spectroscopy, GEP Method | | | | | | |
| Yellowness Index - Avg | — | 13.2 | 60.3 | 70.3 | 45.4 | 31.4 |
| % Transmission - Avg | % | 43.6 | 40.0 | 18.8 | 43.6 | 76.3 |
| % Haze - Avg | % | 98.4 | 82.4 | 99.2 | 88.3 | 57.7 |
| Izod Impact, ASTM D256, ASTM D4812, 23° C., Notched | | | | | | |
| Ductility | % | 0 | 0 | 100 | 100 | 0 |
| Impact Strength-Avg | J/m | 56.8 | 128.0 | 618.0 | 216.0 | 148.0 |
| Izod Impact, ASTM D256, ASTM D4812, 0° C., Notched | | | | | | |
| Ductility | % | X | X | 100.0 | 100.0 | X |
| Impact Strength-Avg | J/m | X | X | 547.0 | 183.0 | X |
| Izod Impact, ASTM D256, ASTM | | | | | | |

TABLE 4B-continued

Effect of Adding Different Types of PC-Si Copolymer

| Components | | Ex2.2 | Ex2.3 | Ex2.5 | Ex2.9 | Ex3.12 |
|---|---|---|---|---|---|---|
| D4812, −20° C., Notched | | | | | | |
| Ductility | % | X | X | 100.0 | 0.0 | X |
| Impact Strength-Avg | J/m | X | X | 482.0 | 167.0 | X |
| Heat deflection temperature (HDT) - ASTM D 648 | | | | | | |
| Stress | MPa | 0.455 | 0.455 | 0.455 | 0.455 | 0.455 |
| Thickness | mm | 3.175 | 3.175 | 3.175 | 3.175 | 3.175 |
| Deflection temp-Avg | ° C. | 88.7 | 90.8 | 120.5 | 102.2 | 91.3 |
| Tensile properties, ASTM D 638, Uniaxial tensile test | | | | | | |
| Modulus of Elasticity-Avg | MPa | 2260.0 | 1698.0 | 1706.0 | 1876.0 | 1504.0 |
| Tensile Strength at Yield-Avg | MPa | 48.1 | 38.5 | 31.6 | 45.5 | 35.5 |
| Tensile Strength at Break-Avg | MPa | 39.0 | 36.1 | 18.4 | 41.7 | 34.5 |
| % Elongation at Yield-Avg | % | 5.48 | 7.35 | 3.81 | 5.64 | 5.91 |
| % Elongation at Break-Avg | % | 30.62 | 73.63 | 4.58 | 92.28 | 75.2 |

As shown in Table 4A, example compositions including 6 wt % PC—Si copolymer had a transmission between 30% and 50%. In addition, the having about 40 wt % of the 6 wt % PC—Si copolymer had a Notched Izod ductility of 100%.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

The invention claimed is:

1. A thermoplastic composition comprising:
   from about 5 wt % to about 70 wt % poly(methyl methacrylate) (PMMA);
   from about 30 wt % to about 45 wt % of a first poly(carbonate-siloxane) copolymer having a siloxane content of from about 35 wt % to about 45 wt %; and
   from about 25 wt % to about 40 wt % of a second poly(carbonate-siloxane) copolymer, wherein the second poly(carbonate-siloxane) copolymer has a siloxane content of from about 15 wt % to about 25 wt % or from about 4 wt % to about 8 wt %.

2. The thermoplastic composition according to claim 1, wherein the first poly(carbonate-siloxane) copolymer has a siloxane content of about 40 wt %.

3. The thermoplastic composition according to claim 1, wherein the second poly(carbonate-siloxane) copolymer has a siloxane content of about 20 wt %.

4. The thermoplastic composition according to claim 1, wherein the second poly(carbonate-siloxane) copolymer has a siloxane content of about 6 wt %.

5. The thermoplastic composition according to claim 1, wherein the composition has a transmission of about 30% to about 50% as measured in accordance with ASTM D 1003-61.

6. The thermoplastic composition according to claim 1, wherein the composition has a Notched Izod ductility of 100% as determined in accordance with ASTM D256.

7. The thermoplastic composition according to claim 1, wherein the composition further comprises one or more additional polymers.

8. The thermoplastic composition according to claim 7, wherein the one or more additional polymers are selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof; copolymers thereof, and combinations thereof.

9. The thermoplastic composition according to claim 1, wherein the composition further comprises one or more additional additives.

10. The thermoplastic composition according to claim 9, wherein the one or more additional additives is selected from the group consisting of: a filler; a pigment; a whitening agent; an optical brightener; a surfactant; a processing aid; a thermal stabilizer; a photochemical stabilizer; and combinations thereof.

11. The thermoplastic composition according to claim 1, wherein the composition has a percent elongation at break as measured in accordance with ASTM D638 that is higher than that of a substantially identical reference composition that does not include the second poly(carbonate-siloxane) copolymer but that includes the same overall siloxane content.

12. An article comprising the thermoplastic composition according to claim 1.

13. The article according to claim 12, wherein the article comprises a film, a sheet, a molded article, a welded article, a filament, or a powder.

14. A thermoplastic composition comprising:
   from about 5 wt % to about 70 wt % poly(methyl methacrylate) (PMMA);
   from about 15 wt % to about 50 wt % of a first poly(carbonate-siloxane) copolymer having a siloxane content of from about 35 wt % to about 45 wt %; and
   from about 10 wt % to about 45 wt % of a second poly(carbonate-siloxane) copolymer, wherein the second poly(carbonate-siloxane) copolymer has a siloxane content of from about 15 wt % to about 25 wt % or from about 4 wt % to about 8 wt %; and
   further wherein the composition has a nano-dispersed poly(carbonate-siloxane) copolymer phase in the PMMA and a single glass transition temperature (Tg).

15. The thermoplastic composition according to claim 14, wherein the first poly(carbonate-siloxane) copolymer has a siloxane content of about 40 wt %.

16. The thermoplastic composition according to claim 14, wherein the second poly(carbonate-siloxane) copolymer has a siloxane content of about 20 wt %.

17. The thermoplastic composition according to claim 14, wherein the composition has a transmission of about 30% to about 50% as measured in accordance with ASTM D 1003-61.

18. The thermoplastic composition according to claim 14, wherein the composition has a Notched Izod ductility of 100% as determined in accordance with ASTM D256.

19. The thermoplastic composition according to claim 14, further comprising one or more additional polymers selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof; copolymers thereof, and combinations thereof.

20. The thermoplastic composition according to claim 14, further comprising one or more additional additives selected from the group consisting of: a filler; a pigment; a whitening agent; an optical brightener; a surfactant; a processing aid; a thermal stabilizer; a photochemical stabilizer; and combinations thereof.

* * * * *